July 30, 1929.  J. J. THACHER  1,722,600
ROTATING GENERATING TOOL FOR AUTOMATIC LATHES
Filed Nov. 1, 1924   2 Sheets-Sheet 1
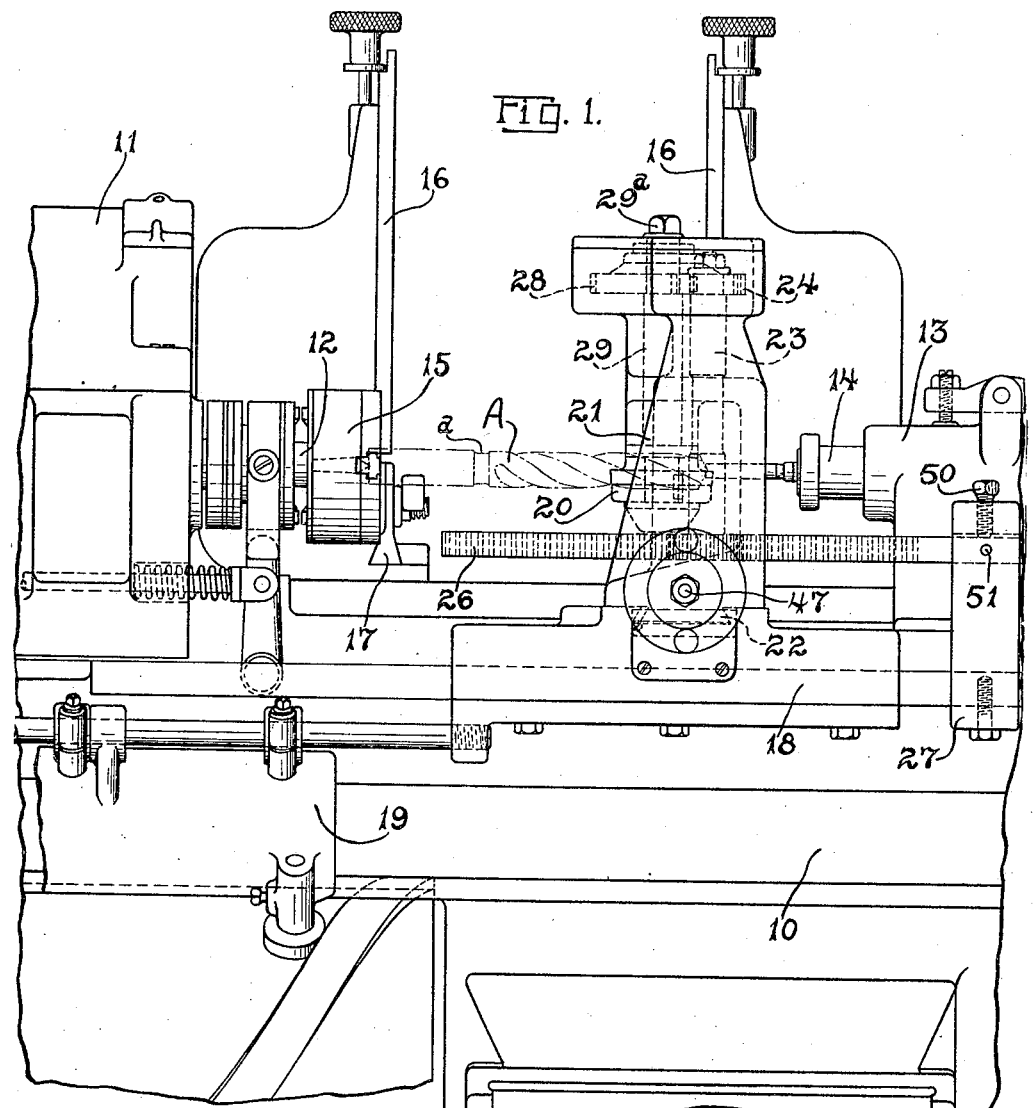
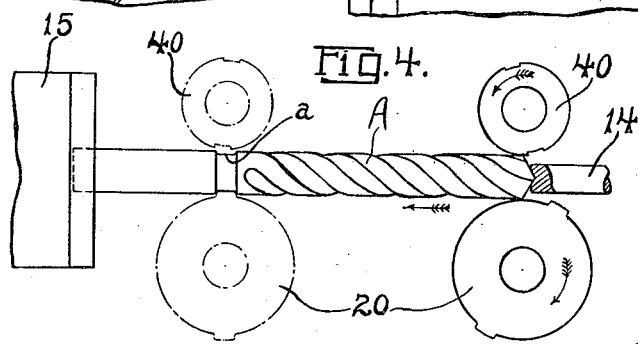
INVENTOR
J.J. Thacher
BY
Joseph H. Schofield
ATTORNEY

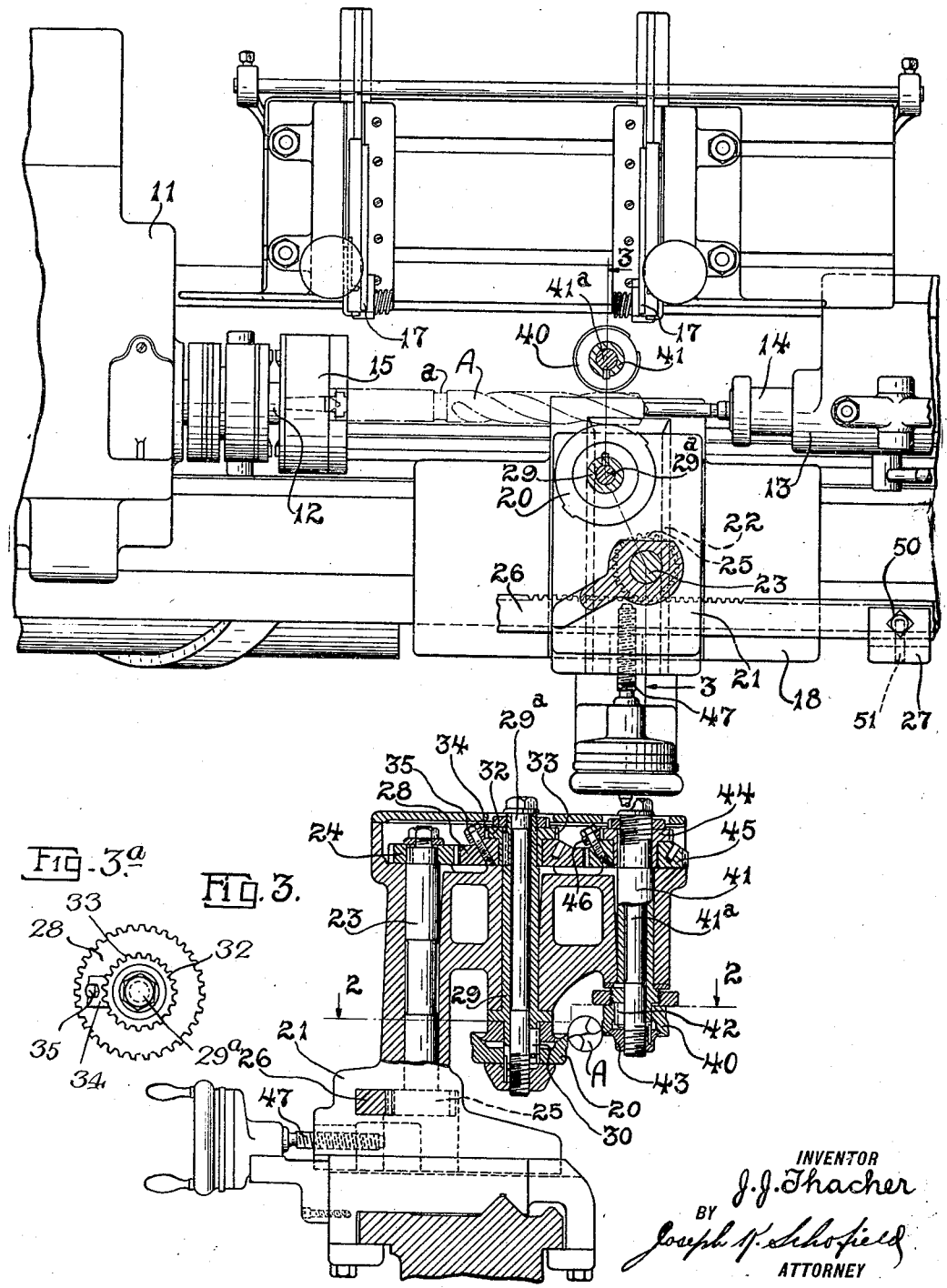

Patented July 30, 1929.

1,722,600

UNITED STATES PATENT OFFICE.

JOHN J. THACHER, OF WETHERSFIELD, CONNECTICUT, ASSIGNOR TO PRATT & WHITNEY COMPANY, OF NEW YORK, N. Y., A CORPORATION OF NEW JERSEY.

ROTATING GENERATING TOOL FOR AUTOMATIC LATHES.

Application filed November 1, 1924. Serial No. 747,340.

This invention relates to automatic machines and in particular to an automatic lathe of the type shown in the patent to Müller 1,252,928 granted January 8, 1918. A principal object of the present invention is to provide an automatic lathe of the type above mentioned with a generating tool adapted to be simultaneously rotated and advanced parallelly to the axis of the blank.

Another object of the invention is to provide a generating rotating tool and actuating mechanism therefor which may be mounted upon the tool carriage usually provided on automatic lathes of this type. One feature which enables me to accomplish the above named objects is that the cutter, or one of them is mounted upon the lower end of a vertical shaft driven through appropriate gearing by another vertical shaft driven from a gear in mesh with a fixed rack.

A further object of the invention is to provide a pair of these generating rotating tools preferably of different diameter and adapted to engage the work at diametrically opposite points, one being adapted to take a roughing cut and the second a finishing cut.

With these and other objects in view, my invention consists in the features of construction and operation set forth in the following specification and illustrated in the accompanying drawings.

In the accompanying drawings annexed hereto and forming a part of this specification I have shown my invention embodied in an automatic lathe adapted for turning the interrupted cylindrical surface of a twist drill, but it will be understood that the invention can be otherwise embodied and that the drawings are not to be construed as defining or limiting the scope of the invention, the claims appended to this specification being relied upon for that purpose.

In the drawings:

Figure 1 is a front elevation of part of an automatic lathe showing the present invention applied thereto.

Fig. 2 is a plan view of an automatic lathe provided with the present invention, parts being cut away to show the engagement of the cutters with the work.

Fig. 3 is a side elevation in section of the cutters and adjacent parts taken upon line 3—3 of Fig. 2.

Fig. 3ª is a detail plan view showing the locking connection between one of the tool spindles and its driving gear, and Fig. 4 is a diagrammatic view in plan showing the relative positions of the cutters at the beginning and end of their cutting movement.

In the above mentioned drawings, I have shown but one embodiment of the invention which is now deemed preferable, but it is to be understood that changes and modifications may be made within the scope of the appended claims without departing from the spirit of the invention.

Briefly and in its broadest aspect, my invention comprises the following principal parts which may be mounted on an automatic lathe substantially similar to that shown in the above referred to patent and having a base, blank supporting and rotating means, a magazine, an automatic transferring mechanism for the blanks and a tool actuating slide. These parts comprise: First, a supporting head rigidly secured to the tool slide; second, parallel shafts thereon; third, cutters mounted upon the lower ends of two of these shafts; fourth, a rack fixed to a part of the base; fifth, a gear meshing with said rack; and sixth, driving connections between said three shafts.

Referring more in detail to the figures of the drawings, the automatic lathe comprises a base 10, a headstock 11 having a work rotating spindle 12 therein, and a tailstock 13, its spindle 14 preferably being adapted to be automatically actuated. On the headstock spindle 12 is a chuck 15 preferably of the floating type. A magazine 16 is provided in rear of the base 10, transfer arms 17 being adapted to convey a blank A from said magazine 16 into operative position on the headstock and tailstock spindles 12 and 14. A tool slide 18 adapted to move in a direction parallel with the axis of the blank A is moved along the base 10 by an actuating slide 19, preferably cam controlled, as shown in the above mentioned patent.

As each of the above referred to mechanisms is, or may be, similar to those shown in the above mentioned patent, it is not thought that a detailed description thereof is necessary. It will be sufficient to state that these mechanisms are controlled in timed relation to each other, so that a blank A may be mounted in operative position upon the spindles from a position in the magazine and rotated at any desired speed. The tool slide may then be moved axially therealong while the cutter or cutters engage the blank A. At the completion of the cutting operation the blank A is released and the cutter or cutters returned to their initial positions preparatory for operation upon a new blank.

The present invention specifically relates to the application of a generating rotating tool 20 mounted upon and being moved with the tool slide 18. This mechanism comprises a support 21 secured detachably to the tool carriage 18 and which preferably takes the place of a cross slide, usually provided on lathes of this type. By operation of a screw 47, the support 21 may be moved toward or from the axis of the blank A. As shown clearly in the drawings, the support 21 on its lower surface is provided with a dovetail projection 22 adapting it to slide in the corresponding recess provided in the tool carriage 18 for a cross slide of usual form.

This support 21 is provided with a vertical driving shaft 23 having a gear 24 at its upper end and a gear 25 at its lower end. The gear 25 at the lower end is in mesh with a rack 26 extending parallelly with the axis of the spindles 13 and 14 so that it is constantly in mesh with the gear 25. The rack 26 is fixed during operation to a part 27 detachably secured to the base of the lathe 10. At the upper end of the shaft 23, the gear 24 thereon is in mesh with a second gear 28 at the upper end of a cutter spindle 29. This spindle 29 carries at its lower end a generally circular disc having cutting surfaces formed upon its periphery. This cutter 20, as shown clearly in Fig. 3, is adapted to be quickly removed or placed upon its spindle 29 and is prevented from rotating relative to its spindle 29 by means of a suitable key 30 or other locking device. Preferably the spindle is provided with a bolt 29ª extending through providing means for attaching the cutter. A nut upon the threaded lower end of the spindle bolt 29ª securely holds the cutter 20 in position on the spindle 29.

As it is frequently desired to vary the rotative position of the cutter 20 for correctly positioning its cutting contour relative to the blank being cut, means are provided therefor to rotate the spindle 29 relative to its gear 28. The gear 28, instead of being directly secured to the spindle 29, is mounted upon a suitable sleeve 32. This sleeve 32 is keyed to the spindle 29 as shown. The sleeve 32 is provided with a flange having notches or teeth 33 cut in its periphery which may be engaged by a locking tooth 34 held in place upon the gear by means of the screw 35 shown in Fig. 3. By these means, with the locking tooth 34 removed, the spindle 29 can be rotated without rotating the gear 28 and, when the cutter 20 is in its correct position, the gear 28 and spindle 29 can be locked together by means of the locking tooth 34.

It will be seen from the above that linear movement of the tool carriage 18 in a direction parallel to the axis of the blank A will cause the driving shaft 23 to rotate and also the cutter spindle 29 by reason of the gear 25 in mesh with the rack 26 and the two intermeshing gears 24 and 28 connecting the driving shaft 23 and spindle 29. The motion imparted to the cutter 20 is therefore a combined linear and rotative one, the rotative movement being in the direcion of the arrow shown in Fig. 4. The cutter therefore has a substantially rolling movement along a line parallel to the axis of the blank being cut. Preferably the gears 24 and 28 and cutter 20 are so proportioned that the cutting surfaces of the cutter 20 do not have a true rolling movement, but engage the blank A with a slight sliding action. That is, the movement of the cutting surfaces on cutter 20 relative to the blank A is a combined rolling and sliding movement. This sliding movement can, of course, be varied by changing the ratios of gears 24 and 28 and the diameter of the cutter 20.

In the present embodiment of the invention, two cutting tools of generally similar shape are provided. The cutter 20 above described is adapted to engage the blank A upon the one side. I preferably mount a supplemental cutter 40 to engage the blank A upon the opposite side of the blank so that the pressure of the tools 20 and 40 against the work will tend to compensate and neutralize each other. The supplemental cutter 40 shown most clearly in Fig. 3, is, as shown, inverted and detachably mounted upon the lower end of the supplemental cutter spindle 41. This cutter 40 may be secured to the spindle 41 by means of a suitable key 42 and retained thereon by means of a nut 43 engaging the threaded lower end of a spindle bolt 41ª. The upper end of the spindle 41 is provided with a sleeve 44 similar to that upon the first cutter spindle 29 and upon this sleeve 44 is a gear 45 in mesh with the gear 28 at the upper end of the first cutter spindle 29. Means are provided in the form of a locking member 46 to relatively adjust the rotative or angular position of the cutter 40 relative to the gear 45.

It will be seen from the above description that movement of the tool carriage 18 along the base 10 in a direction toward the headstock 11 will cause the two cutters 20 and 40 to roll and slide along the surface of the blank A. It will be understood, of course, that the cutters 20 and 40 may be properly positioned by adjustment of the screw 47 and by providing cutters having the correct diameters.

Preferably I make use of the first cutter 20 of large diameter to rough cut the blank A and use the supplemental cutter 40 of smaller diameter to engage the blank just after engagement by the cutter 20 and take a finishing cut. As these cutters 20 and 40 are simultaneously in engagement with the blank, the pressures of the cutters tend to neutralize each other. Also on account of the differences in diameter, the cutter 20 having a larger radius of curvature to its periphery cuts slightly in advance of the cutter 40 and therefore may take a roughing cut. The cutter 40 has a smaller radius of curvature and therefore may take a small finishing cut upon the opposite side of the blank. By adjustment of the cross slide 21 to advance the finishing cutter 40 toward the axis of the work, the same cutters may be employed for slightly different diameters of blanks.

Referring to the diagrammatic figure the operation of the cutters will be clear. Starting with the cutters at the right hand end of the blank, movement of the carriage 18 advances them parallelly along the blank A. Simultaneously the connections from the rack 26 and shaft 23 cause them to rotate in timed relation to the advancing motion. The effect of this combination of motions is to produce a rotary and sliding engagement of the cutting surfaces of the cutter with the blank.

As shown in Fig. 4, the periphery of cutter 20 is so formed that it forms the necked portion $a$ on the blank A. Approximately one half only of its periphery is made use of in one setting of the cutter. For slight variations of blank diameter or to compensate for grinding away of the cutters to resharpen them, adjustments of the cross slide or support 21 must be made. This requires corresponding adjustment of the rack 26 in its clamping member 27. The rack therefore may be clamped by means of a screw 50 in any transverse position in the member 27. To prevent lengthwise movement of the rack 26, a pin 51 may be driven into the member 27 and enter a recess provided in the rack 26.

What I claim is:

1. A metal cutting machine comprising in combination, a base, blank supporting and rotating means thereon, a tool carriage movable parallelly to the axis of rotation of the blank, a rotatable cutting tool on said carriage having its cutting surface upon its periphery, a normally fixed rack, a shaft having a gear thereon adapted to mesh with said rack, a spindle driven from said shaft and carrying said cutting tool, and a supplemental spindle carrying a cutting tool and driven from said first cutting tool spindle whereby movement of said carriage simultaneously advances and rotates the cutting tools and simulates a rolling motion thereof.

2. A metal cutting machine comprising in combination, a base, blank supporting and rotating means thereon, a tool carriage movable parallelly to the axis of rotation of the blank, a rotatable cutting tool on said carriage having its cutting surface upon its periphery, a normally fixed rack, a shaft having a gear in mesh with said rack, a spindle for said rotatable cutting tool and gears connecting said shaft and spindle for rotating said cutter spindle whereby movement of said carriage will simultaneously advance and rotate the cutting tool and simulate a rolling motion thereof.

3. A metal cutting machine comprising in combination, a base, blank supporting and rotating means thereon, a tool carriage movable parallelly to the axis of rotation of the blank, a rotatable cutting tool on said carriage having its cutting surface upon its periphery, a normally fixed rack, and gear means associated with said rack for rotating said cutter, a supplementary rotary cutter disposed upon the opposite side of the blank, a spindle supporting said supplementary cutter, and means to drive said supplementary cutting tool in timed relation to said first cutter, whereby movement of said carriage will simultaneously advance and rotate the cutting tools and simulate a rolling motion thereof.

4. A metal cutting machine comprising in combination, a base, blank supporting and rotating means thereon, a tool carriage movable parallelly to the axis of rotation of the blank, a rotatable cutting tool on said carriage having its cutting surface upon its periphery, a normally fixed rack, and gear means associated with said rack for rotating a vertically disposed shaft, a spindle carrying said cutting tool and driven in timed relation to the shaft, a supplementary rotary cutter disposed upon the opposite side of the blank, a vertically disposed spindle supporting said supplementary cutter, and means to drive said supplementary cutting tool in timed relation to said first cutter, whereby movement of said carriage will simultaneously advance and rotate both of said cutting tools and simulate a rolling motion thereof.

In testimony whereof, I hereto affix my signature.

JOHN J. THACHER.